(12) United States Patent
Seo et al.

(10) Patent No.: US 10,256,501 B2
(45) Date of Patent: Apr. 9, 2019

(54) SECONDARY BATTERY

(71) Applicant: SAMSUNG SDI CO., LTD., Yongin-si, Gyeonggi-do (KR)

(72) Inventors: Nari Seo, Yongin-si (KR); Bokhyun Ka, Yongin-si (KR); Eunhyung Choi, Yongin-si (KR); Donghyuk Chang, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 44 days.

(21) Appl. No.: 15/348,792

(22) Filed: Nov. 10, 2016

(65) Prior Publication Data

US 2017/0179520 A1 Jun. 22, 2017

(30) Foreign Application Priority Data

Dec. 18, 2015 (KR) .................. 10-2015-0181996

(51) Int. Cl.
*H01M 10/0525* (2010.01)
*H01M 10/0587* (2010.01)
(Continued)

(52) U.S. Cl.
CPC ....... *H01M 10/0525* (2013.01); *H01M 2/145* (2013.01); *H01M 2/168* (2013.01); *H01M 10/052* (2013.01); *H01M 10/0562* (2013.01); *H01M 10/0569* (2013.01); *H01M 10/0587* (2013.01); *H01M 2220/20* (2013.01); *H01M 2300/002* (2013.01);
(Continued)

(58) Field of Classification Search
CPC ......... H01M 10/0525; H01M 10/0569; H01M 10/0562; H01M 10/0587; H01M 2/145; H01M 2220/20; H01M 2300/002; H01M 2300/0037

See application file for complete search history.

(56) References Cited

U.S. PATENT DOCUMENTS

2013/0316219 A1* 11/2013 Ha .................. H01M 2/145
429/144
2015/0030906 A1 1/2015 Amin-Sanayei et al.
(Continued)

FOREIGN PATENT DOCUMENTS

JP 2006-120462 A 1/2006
JP 2006-351386 * 12/2006 ............ H01M 10/40
(Continued)

*Primary Examiner* — Osei K Amponsah
(74) *Attorney, Agent, or Firm* — Knobbe, Martens, Olson & Bear, LLP

(57) ABSTRACT

Provided is a secondary battery, which includes a separator having excellent air permeability such that the separator is adhered to a positive electrode plate and/or a negative electrode plate at a low temperature under a low pressure and swelling in an electrolyte solution is relatively suppressed. The secondary battery includes an electrode assembly including a positive electrode plate, a negative electrode plate and a separator interposed between the positive electrode plate and the negative electrode plate, wherein the separator further includes an adhesive layer formed on its surface, the adhesive layer includes a binder, and a gel-sol transition temperature of the binder is in a range of 70° C. to 90° C.

6 Claims, 9 Drawing Sheets

(51) Int. Cl.
  *H01M 10/0569* (2010.01)
  *H01M 10/0562* (2010.01)
  *H01M 2/14* (2006.01)
  *H01M 10/052* (2010.01)
  *H01M 2/16* (2006.01)

(52) U.S. Cl.
  CPC ............... *H01M 2300/0028* (2013.01); *H01M 2300/0037* (2013.01); *Y02E 60/122* (2013.01); *Y02P 70/54* (2015.11)

(56) References Cited

U.S. PATENT DOCUMENTS

2015/0155542 A1* 6/2015 Jeon ..................... H01M 2/166
 429/144
2015/0221951 A1* 8/2015 Hashimoto ............. H01M 4/13
 429/212

FOREIGN PATENT DOCUMENTS

| JP | 2013-122009 A | 6/2013 |
| KR | 10-2000-0042976 A | 7/2000 |
| KR | 10-2014-0135707 A | 11/2014 |

* cited by examiner

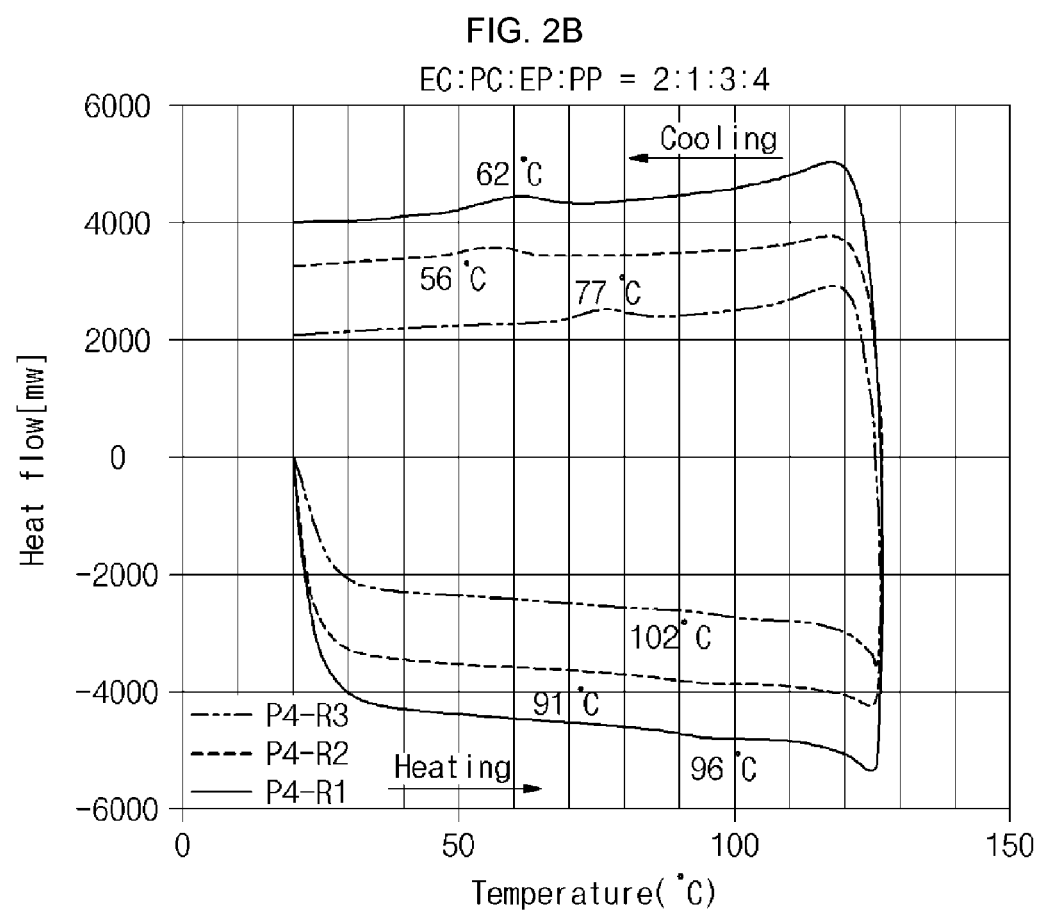

SECONDARY BATTERY

CROSS-REFERENCE TO RELATED APPLICATION

Any and all priority claims identified in the Application Data Sheet, or any correction thereto, are hereby incorporated by reference under 37 CFR 1.57. For example, this application claims priority to and the benefit of Korean Patent Application No. 10-2015-0181996 filed on Dec. 18, 2015 in the Korean Intellectual Property Office, the disclosure of which is incorporated herein in its entirety by reference.

BACKGROUND

Field

The present disclosure relates to a secondary battery.

Description of the Related Technology

Lithium ion secondary batteries are being widely used in portable electronic devices and as power sources of hybrid automobiles or electric vehicles because of various advantages, including a high operation voltage, and a high energy density per unit weight.

The lithium ion secondary battery can be largely classified as a pouch type secondary battery, a prismatic type secondary battery and a cylinder type secondary battery. Specifically, the pouch type secondary battery generally includes an electrode assembly of a winding type or a stacking type, an electrolyte solution allowing movement of lithium ions, and a pouch case accommodating the electrode assembly and the electrolyte solution.

The above information disclosed in this Background section is only for enhancement of understanding of the background of the described technology and therefore it may contain information that does not form the prior art that is already known in this country to a person of ordinary skill in the art.

SUMMARY

Embodiments of the present disclosure provide a secondary battery, which includes a separator having excellent air permeability such that the separator is adhered to a positive electrode plate and/or a negative electrode plate at a low temperature under a low pressure and swelling in an electrolyte solution is relatively suppressed.

The above and other aspects of the present disclosure will be described in or be apparent from the following description of exemplary embodiments.

According to an aspect of the present disclosure, there is provided a secondary battery including an electrode assembly including a positive electrode plate, a negative electrode plate and a separator interposed between the positive electrode plate and the negative electrode plate, wherein the separator further includes an adhesive layer formed on its surface, wherein the adhesive layer includes a binder, and a gel-sol transition temperature of the binder is in a range of about 70° C. to about 90° C.

In some embodiments, the binder may have a molecular weight in a range of about 1000K g/mol to about 1500K g/mol.

In some embodiments, the binder may include a polyvinylidene fluoride-hexafluoropropyl (PVdF-HFP) copolymer.

In some embodiments, the HFP content of the PVdF-HFP copolymer may be contained in the binder in a content ranging from about 3 wt % to about 7 wt %.

In some embodiments, the secondary battery may further include an electrolyte solution, wherein the electrolyte solution includes an organic solvent selected from the group consisting of ethylene carbonate (EC), propylene carbonate (PC), ethyl propionate (EP) and propyl propionate (PP) and mixtures of two or more compounds.

In some embodiments, the binder may have a gel-sol transition temperature in a range of about 74° C. to about 88° C.

In some embodiments, the binder may have a sol-gel transition temperature in a range of about 28° C. to about 51° C.

In some embodiments, the separator and the positive electrode plate or the negative electrode plate may be adhered to each other with a binding strength in a range of about 0.01 gf/mm to about 1.5 gf/mm.

In some embodiments, the adhesive layer may further include inorganic particles, which are selected from the group consisting of $BaTiO_3$, $Pb(Zr_x,Ti_{1-x})O_3$ (PZT), where $0<x<1$, $Pb_{1-x}La_xZr_{1-y}Ti_yO_3$ (PLZT), where $0<x<1$ and $0<y<1$, $Pb(Mg_{1/3}Nb_{2/3})O_{3-x}PbTiO_3$ (PMN-PT), where $0<x<1$, hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ and mixtures of two or more of these materials.

In some embodiments, the binder and the inorganic particles may be contained in the adhesive layer in a weight ratio of 1:2 to 1:5.

As described above, the secondary battery according to an embodiment of the present disclosure may include a separator having excellent air permeability such that the separator is adhered to a positive electrode plate and/or a negative electrode plate at a low temperature under a low pressure.

In some embodiments, the separator includes an adhesive layer formed on its surface and the adhesive layer include a binder, which has a sol-gel transition temperature in a range of approximately 70° C. to approximately 90° C., the secondary battery 100 can be manufactured at a relatively low temperature (e.g., approximately 70° C. to approximately 90° C.) under a relatively low pressure (e.g., approximately 150 kgf to approximately 250 kgf).

In some embodiments, the separator of the thus manufactured secondary battery 100 may not undergo a reduction in the air permeability since the secondary battery 100 is manufactured at the relatively low temperature under the relatively low pressure. In general, if a secondary battery is manufactured at a relatively high temperature (e.g., at 100° C. or higher) under a relatively high pressure (e.g., at 400 kgf or higher), it is known that there is a marked reduction in the air permeability of the separator.

In addition, embodiments of the present disclosure provide a secondary battery having improved air permeability of the separator due to suppressed swelling of an adhesive layer in an electrolyte solution.

In some embodiments, the adhesive layer including a binder and the binder having a molecular weight of at least approximately 1000K g/mol, approximately 150% or less of swelling of the adhesive layer in the electrolyte solution is caused since the separator includes the adhesive layer formed on its surface. Since the swelling is suppressed, the secondary battery without a reduction in the air permeability of the separator is attained. It is generally known that the air permeability of the separator is markedly reduced when swelling of the adhesive layer is caused to a high extent (e.g., a swelling value of approximately 600% or higher).

BRIEF DESCRIPTION OF THE DRAWINGS

The above and other features of the present disclosure will become more apparent by describing in detail exemplary embodiments thereof with reference to the attached drawings in which:

FIG. 2A is a graph illustrating a differential scanning calorimeter (DSC) evaluation result for a binder according to an embodiment of the present disclosure and FIG. 2B is a graph illustrating a DSC evaluation result for a binder according to Comparative Example;

DETAILED DESCRIPTION

Figure 1A:
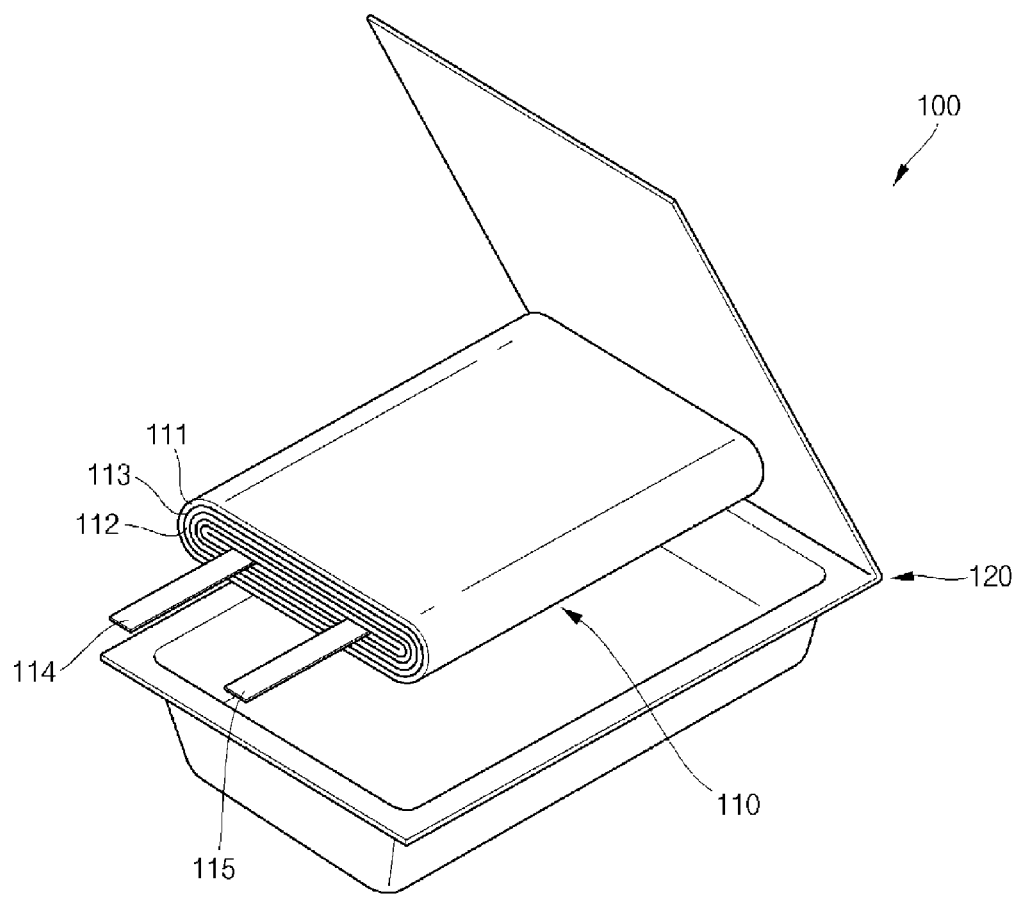
FIG. 1A is an exploded perspective view illustrating an example of a pouch type secondary battery according to an embodiment of the present disclosure.

Hereinafter, examples of embodiments of the disclosure will be described in detail with reference to the accompanying drawings such that they can easily be made and used by those skilled in the art.

The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In the drawings, the thickness of layers and regions are exaggerated for clarity. Like numbers refer to like elements throughout. As used herein, the term "and/or" includes any and all combinations of one or more of the associated listed items. It will also be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise/include" and/or "comprising/including," when used in this specification, specify the presence of stated features, integers, steps, operations, elements, and/or components, but do not preclude the presence or addition of one or more other features, integers, steps, operations, elements, components, and/or groups thereof.

In addition, as used herein, the term "separator" includes a separator generally used in liquid electrolyte batteries using a liquid electrolyte having a low affinity to the separator. Further, as used herein, the term "separator" may include an intrinsic solid polymer electrolyte in which the electrolyte is strongly bound to the separator to then be recognized as being the same as the separator, and/or a gel solid polymer. Therefore, the meaning of the separator should be defined as specifically defined in the specification of the present disclosure.

Figure 1B:
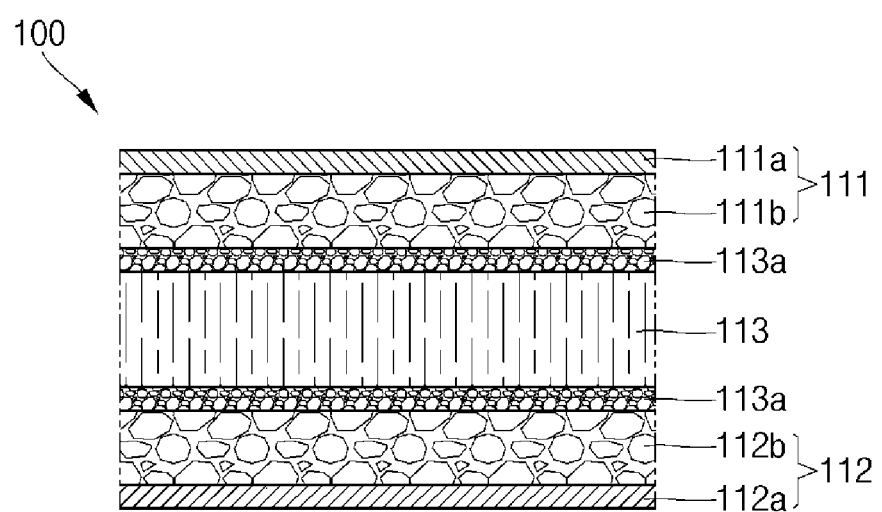
FIG. 1B is a partially enlarged cross-sectional view illustrating a stacking structure of an electrode assembly.

FIG. 1A is an exploded perspective view illustrating an example of a pouch type secondary battery (100) according to an embodiment of the present disclosure, and FIG. 1B is a partially enlarged cross-sectional view illustrating a stacking structure of an electrode assembly (110).

As illustrated in FIG. 1A, the secondary battery 100 may include, for example, an electrode assembly 110 and a pouch case 120 accommodating the electrode assembly 110 together with an electrolyte solution. The electrode assembly 110 may include a positive electrode plate 111, a negative electrode plate 112, a separator 113, and a positive electrode tab 114 and a negative electrode tab 115 extending from the positive electrode plate 111 and the negative electrode plate 112 to the outside of the pouch case 120. The pouch case 120 protects the electrode assembly 110 and the electrolyte solution from external circumstances and insulating layers may be formed on both surfaces of a metal thin film. The pouch case 120 may be sealed from the exterior of the electrode assembly 110, forming an external appearance of the secondary battery 100.

While the present disclosure has been described with regard to the pouch type secondary battery 100 by way of example, the inventive concept of the present disclosure may also be applied to a prismatic type secondary battery and/or a cylindrical secondary battery. In addition, while the present disclosure has been described with regard to the winding type electrode assembly 110 by way of example, the inventive concept of the present disclosure may also be applied to a stacking type electrode assembly.

As illustrated in FIG. 1B, the positive electrode plate 111 and/or negative electrode plate 112 may be adhered to top and bottom surface of the electrode assembly 110 in view of the separator 113. In some embodiments, an adhesive layer 113a may be formed on a top surface and/or a bottom surface of the separator 113 to be adhered to the positive electrode plate 111 and/or the negative electrode plate 112. In some embodiments, the positive electrode plate 111 and/or negative electrode plate 112 may be adhered to the separator 113 by the adhesive layer 113a, respectively. In some embodiments, the separator 113 may have a thickness in a range of approximately 5 µm to approximately 20 µm and the adhesive layer 113a may have a thickness in a range of approximately 1 µm to approximately 5 µm, but the present disclosure is not limited thereto.

In some embodiments, the positive electrode plate 111 includes a positive electrode current collector 111a, made of, e.g., an aluminum foil, and a positive electrode active material layer 111b formed on a surface of the positive electrode current collector 111a. In some embodiments, the negative electrode plate 112 includes a negative electrode current collector 112a, made of, e.g., a copper foil or a nickel foil, and a negative electrode active material layer 112b formed on a surface of the negative electrode current collector 112a.

In some embodiments, the positive electrode active material layer may include at least one selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$, where M1 and M2 are independently one element selected from the group consisting of Al, Ni, Co, Fe, Mn, V, Cr, Ti, W, Ta, Mg and Mo, x, y and z independently represent fractions of oxide composition elements, where $0 \le x < 0.5$, $0 \le y < 0.5$, $0 \le z < 0.5$, and $x+y+z < 1$, but aspects of the present disclosure are not limited thereto.

In some embodiments, the negative electrode active material layer may include at least one selected from the group consisting of lithium absorbing materials including a lithium metal, a lithium alloy, carbon, petroleum coke, activated carbon, graphite or the like, but aspects of the present disclosure are not limited thereto.

In some embodiments, the separator 113 may be a porous base member made of polyolefins, such as polyethylene or polypropylene, polyesters, such as polyehtylene terephthalate or polybutylene terephthalate; polyamide, such as aramid, polyacetal, polycarbonate, polyimide, polyeether ketone, polyether sulfone, polyphenylene oxide, polyphenyl sulfide, polyethylene naphthalene. In order to improve thermal stability, the separator 113 may be made of a heat-resistant polymer, and examples thereof may include a porous base material such as polysulfone, polyvinylidenfluoride, derivatives thereof, mixtures thereof, or the like, but aspects of the present disclosure are not limited thereto.

In some embodiments, the separator 113 may be formed of a single layer or multiple layers of two or more layers. In some embodiments, the separator 113 may be a combination of multiple layers including, for example, polyethylene/polypropylene, polyethylene/polypropylene/polyethylene, polypropylene/polyethylene/polypropylene, or the like.

In some embodiments, the adhesive layer 113a may include a binder, and examples of the binder may include not only polyvinylidene fluoride-hexafluoropropyl copolymer (PVdF-HFP), but also polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyvinyl alcohol, polyethylene-co-vinyl acetate), polyethylene oxide), polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan or carboxyl methyl cellulose.

In some embodiments, the binder has a gel-sol transition temperature in a range of approximately 70° C. to approximately 90° C., and a sol-gel transition temperature in a range of approximately 25° C. to approximately 55° C. In some embodiments, the binder may make a transition from a gel phase to a sol phase at a temperature in the range of approximately 70° C. to approximately 90° C. and from a sol phase to a gel phase at a temperature in the range of approximately in the 25° C. to approximately 55° C. in order to impart an adhesive force to the binder.

In some embodiments, the binder may particularly include a PVdF-HFP copolymer to achieve the gel-sol transition temperature and the sol-gel transition temperature in the ranges stated above. In some embodiments, HFP content of the PVdF-HFP copolymer is preferably contained in the binder in a content of approximately 3 wt % to approximately 7 wt %.

If the content of HFP content of the PVdF-HFP copolymer deviates from or is more than the aforementioned content range of approximately 3 wt % to approximately 7 wt %, the gel-sol transition temperature of the binder may be lower than the aforementioned temperature range (e.g., 70° C. to 90° C.). However, swelling of the binder in the electrolyte solution may be caused to a relatively high extent. In contrast, when the HFP content of the PVdF-HFP copolymer is contained in the binder in a content ranging from 3 wt % to 7 wt %, the gel-sol transition temperature of the binder is in a range of approximately 70° C. to approximately 90° C., in which the binder swells in the electrolyte solution to an allowable extent (e.g., less than approximately 150%).

In addition, if the content of HFP content of the PVdF-HFP copolymer deviates from or is less than the aforementioned content range of approximately 3 wt % to approximately 7 wt %, the binder swells in the electrolyte solution to an allowable extent. However, the gel-sol transition temperature of the binder may deviate from or be more than the aforementioned temperature range (e.g., 70° C. to 90° C.).

As described above, when the binder coated on the separator 113 is a PVdF-HFP copolymer, specifically including HFP content of the PVdF-HFP copolymer of approximately 3 wt % to approximately 7 wt %, the gel-sol transition temperature of the binder may be in the range of approximately 70° C. to approximately 90° C. and the binder swells in the electrolyte solution to an extent of less than approximately 150%.

Therefore, the pouch type secondary battery 100 according to the present disclosure can be manufactured at a low temperature (e.g., approximately 70° C. to approximately 90° C.) under a low pressure (e.g., approximately 150 kgf to approximately 250 kgf). In some embodiments, the adhesive layer 113a coated on the separator 113 has a gel-sol transition temperature of the binder in the range of approximately 70° C. to approximately 90° C., the electrode assembly 110 and/or the pouch case 120 accommodating the electrode assembly 110 may be heated in a mold within the aforementioned temperature range and may be pressed with a force of approximately 150 kgf to approximately 250 kgf, the separator 113 of the electrode assembly 110 may be adhered to the positive electrode plate 111 and the negative electrode plate 112 with a predetermined binding strength (or a peel strength), respectively.

Additionally, since the pouch type secondary battery 100 is manufactured at the low temperature under the low pressure, deterioration of active material and decomposition of electrolyte solution are suppressed, thereby preventing internal electric resistance from increasing. In addition, since the air permeability of the separator 113 is not lowered, thereby improving rate characteristics (charging/discharging rates) of the secondary battery 100.

In some embodiments, the binder may have a molecular weight in a range of approximately 1000K g/mol to approximately 1500K g/mol. In some embodiments, the binder swells in the electrolyte solution to an extent of approximately 130% to approximately 150% if the binder is a PVdF-HFP copolymer having a molecular weight in a range of approximately 1000K g/mol to approximately 1500K g/mol.

In some embodiments, the binder swells in the electrolyte solution to a relatively high extent of approximately higher than 150%, and an adhesive force with respect to the separator 113 may be lowered if the binder is a PVdF-HFP copolymer having a molecular weight of less than approximately 1000K g/mol. In some embodiments, the binder swells in the electrolyte solution to a relatively low extent of approximately lower than 130% if the binder is a PVdF-HFP copolymer having a molecular weight of larger than 1500K g/mol. However, it is difficult to form the adhesive layer 113a with uniformity due to high viscosity if the binder is a PVdF-HFP copolymer having a molecular weight of larger than 1500K g/mol.

In some embodiments, the binder swells in the electrolyte solution to an extent ranging from approximately 130% to approximately 150% when the binder coated on the separator 113 is a PVdF-HFP copolymer having a molecular weight in the range of approximately 1000K g/mol to approximately 1500K g/mol. In some embodiments, the content of HFP contained in the PVdF-HFP copolymer may be in a range of approximately 3 wt % to approximately 7 wt %.

Therefore, during the manufacturing process of the pouch type secondary battery according to the present disclosure, since swelling of the adhesive layer 113a or the binder is caused to a relatively low extent, the air permeability of the separator 113 may not be lowered, thereby allowing lithium ions to easily pass the separator 113 and demonstrating excellent rate characteristics of the secondary battery.

In some embodiments, the adhesive layer 113a may further include inorganic particles when necessary. In some embodiments, the inorganic particles may be selected from the group consisting of $BaTiO_3$, $Pb(Zr_xTi_{1-x})O_3$ (PZT), where $0<x<1$, $Pb_{1-x}La_xZr_{1-y}Ti_yO_3$ (PLZT), where $0<x<1$ and $0<y<1$, $Pb(Mg_{1/3}Nb_{2/3})O_{3-x}PbTiO_3$ (PMN-PT), where $0<x<1$, hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ and mixtures of two or more of these materials, but aspects of the present disclosure are not limited thereto. In some embodiments, the inorganic particles may have particle sizes in a range of approximately 0.1 µm to approximately 3 µm.

In some embodiments, the binder and the inorganic particles may be contained in the adhesive layer 113a in a weight ratio of approximately 1:2 to approximately 1:5, but aspects of the present disclosure are not limited thereto.

In some embodiments, the inorganic particles allow the adhesive layer 113a to have a porosity to prevent lithium ion conductivity from being lowered and suppressing a reduction in the charging and discharging performance of the secondary battery.

In some embodiments, the electrolyte solution may include an organic solvent and a lithium salt.

In some embodiments, the organic solvent may include one selected from the group consisting of ethylene carbonate (EC), propylene carbonate (PC), ethylpropionate (EP), propyl propionate (PP), ethylmethyl carbonate (EMC), dimethyl carbonate (DMC), diethyl carbonate (DEC) and fluoroethylene carbonate (FEC) or mixtures of two or more of these materials. In some embodiments, the organic solvent may also include one selected from the group consisting of methyl propylcarbonate (MPC), ethylpropylcarbonate (EPC), methylethyl carbonate (MEC), butylenes carbonate (BC), ethyl acetate, methyl acetate, propyl acetate, and methyl propionate and mixtures of two or more of these materials.

In some embodiments, the lithium salt may be selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiN(C_xF_{2x+1}SO_2)(C_yF_{2y+1}SO_2)$, x and, y are natural numbers, LiCl, LiI and mixtures thereof.

Example 1

A binder including a PVdF-HFP copolymer, specifically approximately 3 wt % to approximately 7 wt % of HFP content of the PVdF-HFP copolymer, and having a molecular weight of approximately 1000K g/mol to approximately 1500K g/mol was prepared. The binder and inorganic particles were mixed in distilled water to prepare a slurry, and the slurry was coated on a separator to a thickness of approximately 10 µm at room temperature and dried, thereby forming an adhesive layer. Here, $Al_2O_3$ (D50=500 nm) was used as the inorganic particles.

The separator having the adhesive layer (consisting of the binder and the inorganic particles) was put into an electrolyte solution including organic solvents EC, PC, EP and PP mixed in a ratio of 2:1:3:4 parts by volume (i.e., EC:PC:EP:PP=2:1:3:4), followed by evaluating the separator by DSC.

Example 2

A separator was formed in the same manner as in Example 1, and then put into an electrolyte solution including organic solvents EC, PC, EP and PP mixed in a ratio of 2:2:6 parts by volume (i.e., EC:PC:PP=2:2:6), followed by evaluating the separator by DSC. In addition, the separator was interposed between positive and negative electrode plates in the electrolyte solution to then be pressed with a force of 200 kgf at a temperature of 85° C., followed by evaluating a binding strength (a peel strength).

Example 3

A separator was formed in the same manner as in Example 1, and then put into an electrolyte solution including organic solvents EC, PC, EP and PP mixed in a ratio of 2:1:2:5 parts by volume (i.e., EC:PC:EP:PP=2:1:2:5), followed by evaluating the separator by DSC. In addition, the separator was interposed between positive and negative electrode plates in the electrolyte solution to then be pressed with a force of 350 kgf at a temperature of 85° C., followed by evaluating a binding strength (a peel strength).

Example 4

A separator was formed in the same manner as in Example 1, and then put into an electrolyte solution including organic solvents EC, PC, EP and PP mixed in a ratio of 2:2:3:3 parts by volume (i.e., EC:PC:EP:PP=2:2:3:3), followed by evaluating the separator by DSC. In addition, the separator was interposed between positive and negative electrode plates in the electrolyte solution to then be pressed with a force of 200 kgf at a temperature of 95° C., followed by evaluating a binding strength (a peel strength).

Comparative Example

A separator having an adhesive layer was formed in substantially the same manner as in Example 1, except an acrylate-based binder was used.

The thus formed separator was put into an electrolyte solution including organic solvents EC, PC, EP and PP mixed in a ratio of 2:1:3:4 parts by volume (i.e., EC:PC:EP:PP=2:1:3:4), followed by evaluating the separator by DSC.

In addition to the DSC evaluation, the separator was analyzed by evaluating air permeability, changes in the thickness by cycle characteristics at high temperature and room temperature, and swelling in the electrolyte solution.

In regard of DSC evaluation, it was found that the gel-sol transition temperature and the sol-gel transition temperature were affected by parts by volume of the organic solvents in the electrolyte solution to some extents. Based on the finding, DSC evaluation was performed while varying parts by volume of the organic solvents in the electrolyte solution.

Here, DSC was used to characterize physical properties of materials because it can quickly and highly accurately analyze states of the materials with respect to temperature changes. The gel-sol transition temperature and/or the sol-gel transition temperature of a polymeric material can be identified by DSC evaluation.

Figure 2A:
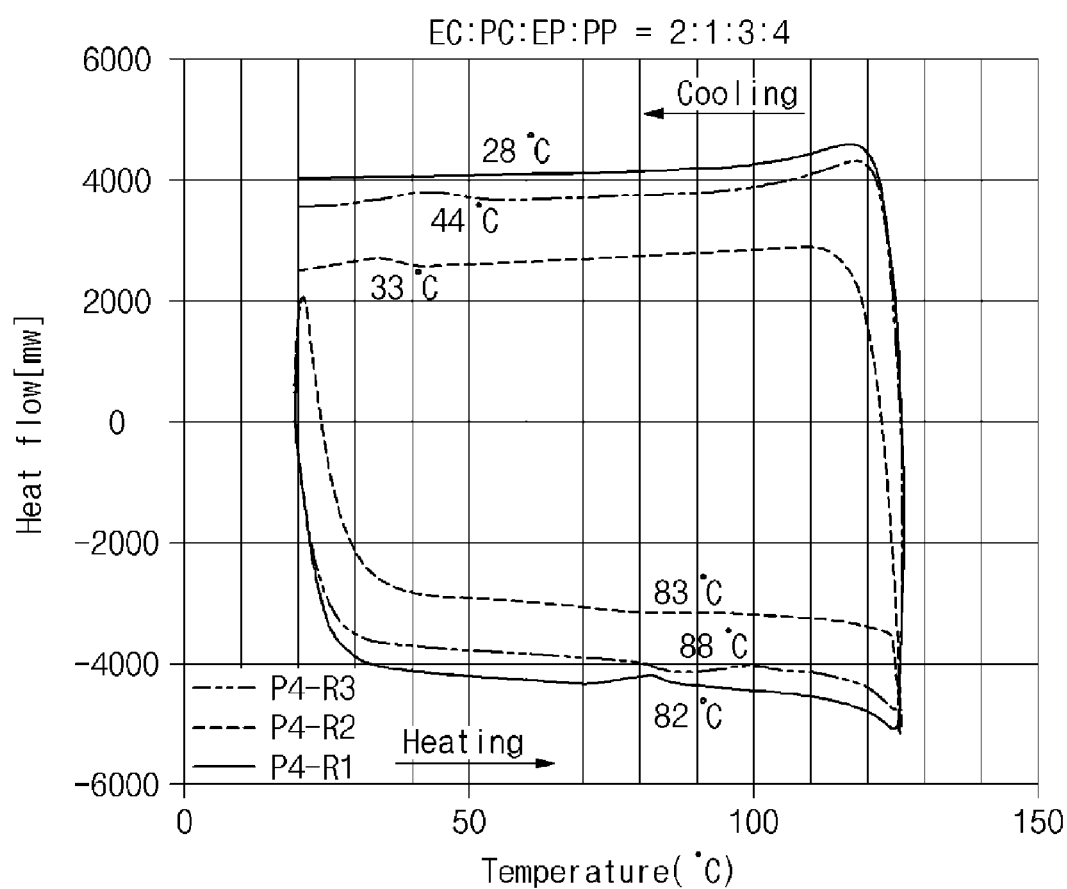

FIG. 2A is a graph illustrating a differential scanning calorimeter (DSC) evaluation result for a binder according to an embodiment of the present disclosure and FIG. 2B is a graph illustrating a DSC evaluation result for a binder according to Comparative Example. In FIGS. 2A and 2B, the X axis indicates temperature and the Y axis indicates heat flow or heat capacity.

In DSC plots of Examples 1, 2 and 3 and Comparative Example, P4-R1 indicates that a weight ratio of the binder to the inorganic particles is 1:5, P4-R2 indicates that a weight ratio of the binder to the inorganic particles is 1:3, and P4-R3 indicates that a weight ratio of the binder to the inorganic particles is 1:2.

As illustrated in FIGS. 2A and 2B, when the organic solvents EC, PC, EP and PP were contained in the electrolyte solution in a mixture ratio of 2:1:3:4 parts by volume, the binder prepared in Example 1 had a gel-sol transition temperature in a range of 82° C. to 88° C. and a sol-gel transition temperature in a range of 28° C. to 44° C., while the binder prepared in Comparative Example 1 had a gel-sol transition temperature in a range of 91° C. to approximately 102° C. and a sol-gel transition temperature in a range of 56° C. to 77° C.

Figure 3A:
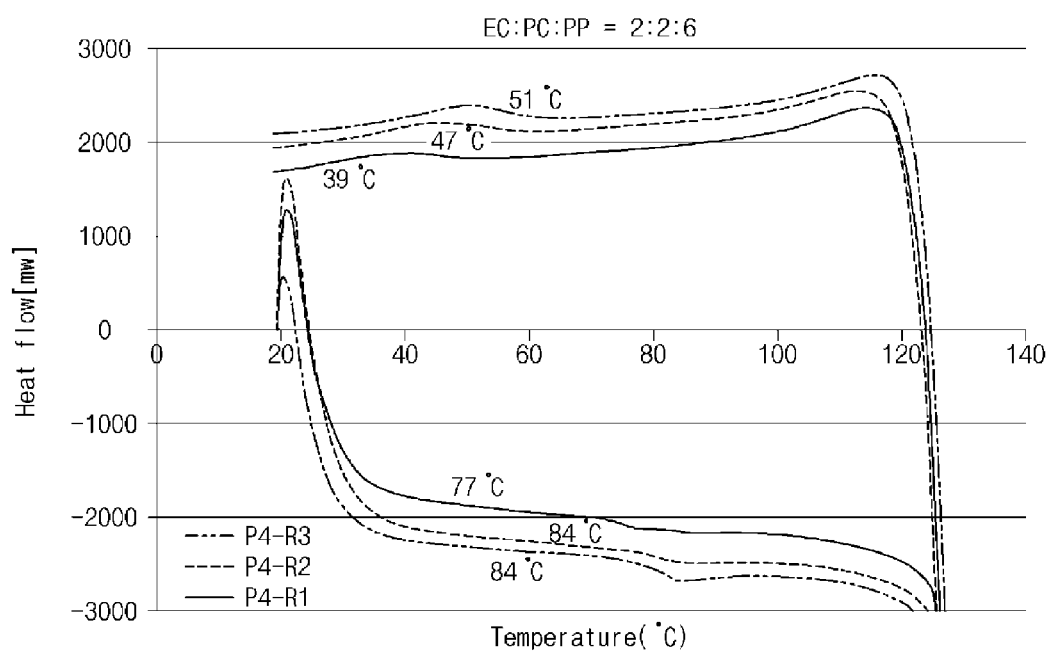
FIGS. 3A and 3B are graphs illustrating DSC evaluation results for binders according to other embodiments of the present disclosure.
Figure 3B:
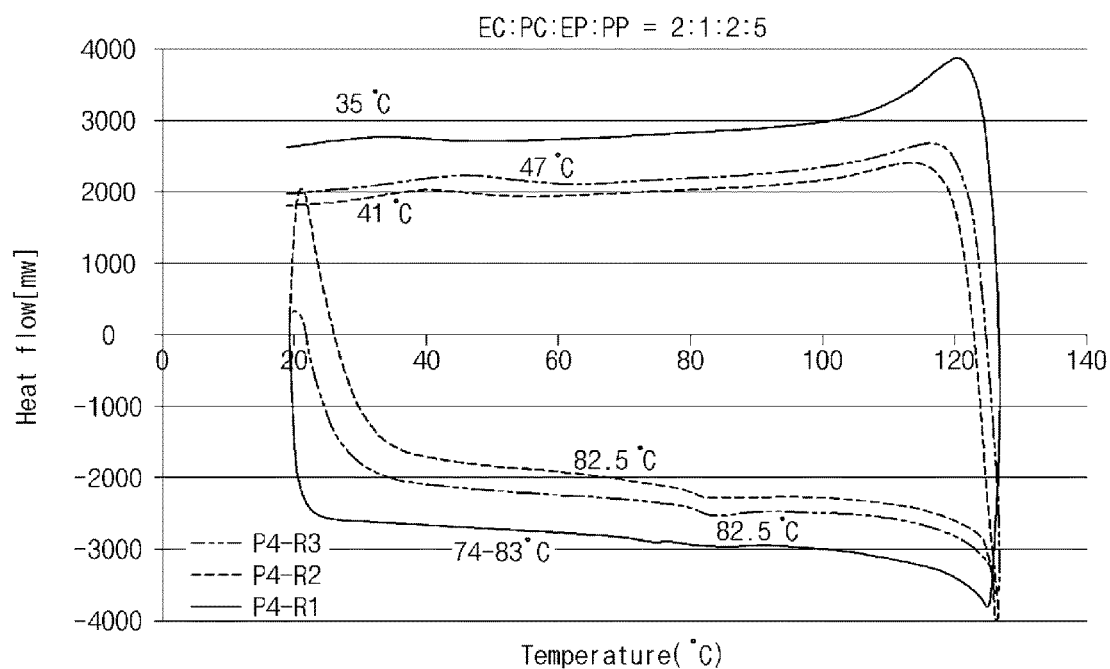

FIGS. 3A and 3B are graphs illustrating DSC evaluation results for binders according to other embodiments of the present disclosure.

As illustrated in FIG. 3A, when the organic solvents EC, PC and PP were contained in the electrolyte solution in a mixture ratio of 2:2:6 parts by volume, the binder prepared in Example 2 had a gel-sol transition temperature in a range of 77° C. to 84° C. and a sol-gel transition temperature in a range of 39° C. to 51° C. In addition, as illustrated in FIG. 3B, when the organic solvents EC, PC, EP and PP were contained in the electrolyte solution in a mixture ratio of 2:1:2:5 parts by volume, the binder prepared in Example 3 had a gel-sol transition temperature in a range of 74° C. to 83° C. and a sol-gel transition temperature in a range of 35° C. to 47° C.

The evaluation results of Examples 1, 2 and 3 and Comparative Example are summarized in Table 1 below.

under a low pressure. In addition, since the secondary battery according to the present disclosure can be manufactured at a low temperature under a low pressure, deterioration of active material and decomposition of electrolyte solution are suppressed, thereby improving rate characteristics of the secondary battery.

Figure 4:
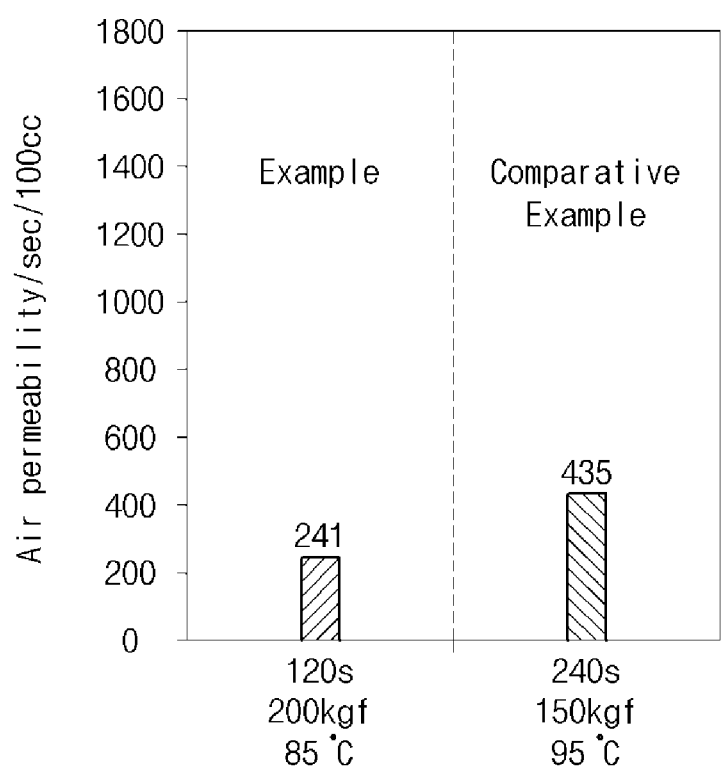
FIG. 4 is a graphical representation of air permeability evaluation results for a separator having a binder according to the present disclosure coated thereon and a separator having a binder according to Comparative Example coated thereon.

FIG. 4 is a graphical representation of air permeability evaluation results for a separator having a binder according to Example 1 of the present disclosure coated thereon and a separator having a binder according to Comparative Example coated thereon. In FIG. 4, the X axis indicates a separator according to Example 1 of the present disclosure and a separator according to Comparative Example and the Y axis indicates air permeability (sec/100 cc). Here, the air permeability means a time taken for the air of 100 cc to permeate the separator and is evaluated in a state in which the separator is not yet impregnated into the electrolyte solution.

As illustrated in FIG. 4, the separator according to Example 1 of the present disclosure was pressed at 85° C. with a force of 200 kgf for 120 seconds and was then evaluated to have air permeability of approximately 241 seconds, while the separator according to Comparative Example was pressed at 95° C. with a force of 150 kgf for 240 seconds and was then evaluated to have air permeability of approximately 435 seconds.

The separator according to Example of the present disclosure had air permeability of 241 seconds/100 cc and the separator according to Comparative Example had air permeability of 435 seconds/100 cc.

Therefore, the separator having a binder according to Example 1 of the present disclosure coated thereon had higher air permeability than the separator having a binder according to Comparative Example coated thereon.

As described above, since the separator according to Example 1 of the present disclosure demonstrates better air permeability than the separator according to Comparative Example, the secondary battery according to the embodiment of the present disclosure may have an improved rate characteristic.

Figure 5:
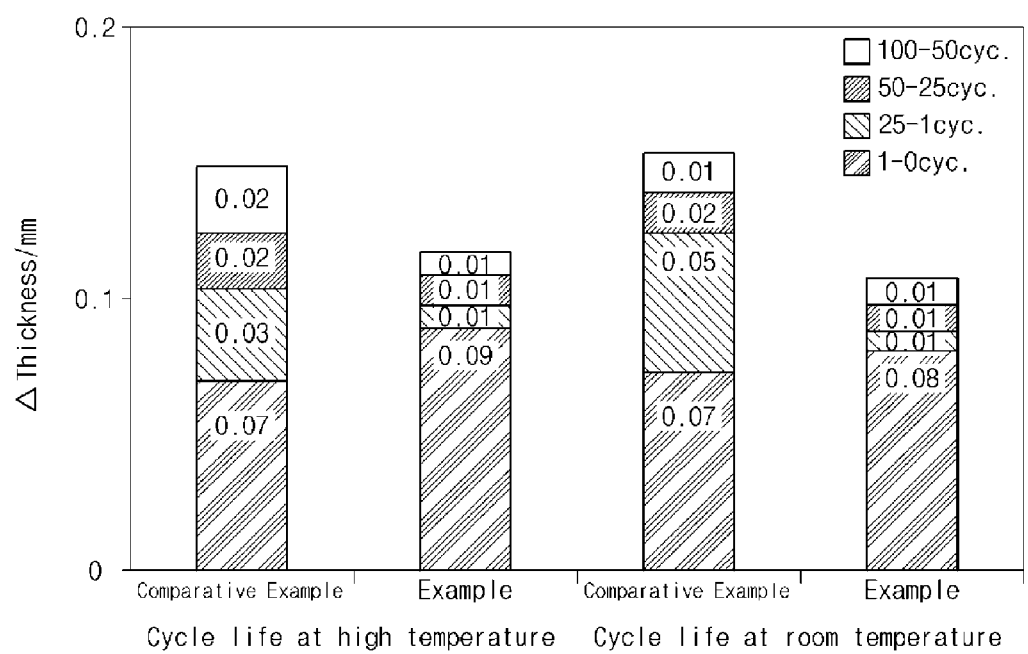
FIG. 5 is a graphical representation of high temperature and low temperature (room temperature) characteristics of a separator having a binder according to Example 1 of the present disclosure coated thereon and a separator having a binder according to Comparative Example coated thereon.

FIG. 5 is a graphical representation of high temperature and low temperature (room temperature) characteristics of a separator having a binder according to the present disclosure coated thereon and a separator having a binder according to Comparative Example coated thereon.

In FIG. 5, the X axis indicates separators according to Example 1 of the present disclosure and the separator according to Comparative Example under cycle life tests at high temperature and low temperature, and the Y axis

TABLE 1

|  |  | Example 1 | Example 2 | Example 3 | Comparative Example |
|---|---|---|---|---|---|
| Binder type |  | PVdF-HFP copolymer | PVdF-HFP copolymer | PVdF-HFP copolymer | Acryl-based binder |
| Transition temperature swelling (1 day@45° C.) | Gel->Sol | 82~88° C. | 77~84° C. | 74~83° C. | 91~102° C. |
|  | Sol->Gel | 28~44° C. | 39~51° C. | 35~47° C. | 56~77° C. |

As described above, since the adhesive layer, that is, the binder, formed on each of the separators according to Examples of the present disclosure had a relatively low gel-gel temperature, the secondary battery according to the present disclosure can be manufactured at a low temperature indicates a change in the thickness of separator. In addition, the high temperature means a temperature in a range of 40° C. to 60° C., and the room temperature means a temperature in a range of 20° C. to 40° C. In addition, the separators according to Example 1 of the present disclosure and Comparative Example were impregnated into the same electrolyte solution to be evaluated.

As illustrated in FIG. 5, after one charge/discharge cycle is performed, the inventive separator according to Example 1 demonstrated a larger difference in the thickness than the conventional separator according to Comparative Example. However, after 1 to 25 charge/discharge cycles, 25 to 50 charge/discharge cycles and 50 to 100 charge/discharge cycles, the inventive separator according to Example 1 demonstrated a smaller difference in the thickness than the conventional separator according to Comparative Example.

Therefore, it is demonstrated that each of the separators according to Examples of the present disclosure had reduced swelling in the electrolyte solution, compared to the separator according to Comparative Example, thereby improving the air permeability of the separator and the rate characteristic of the secondary battery.

Figure 6:
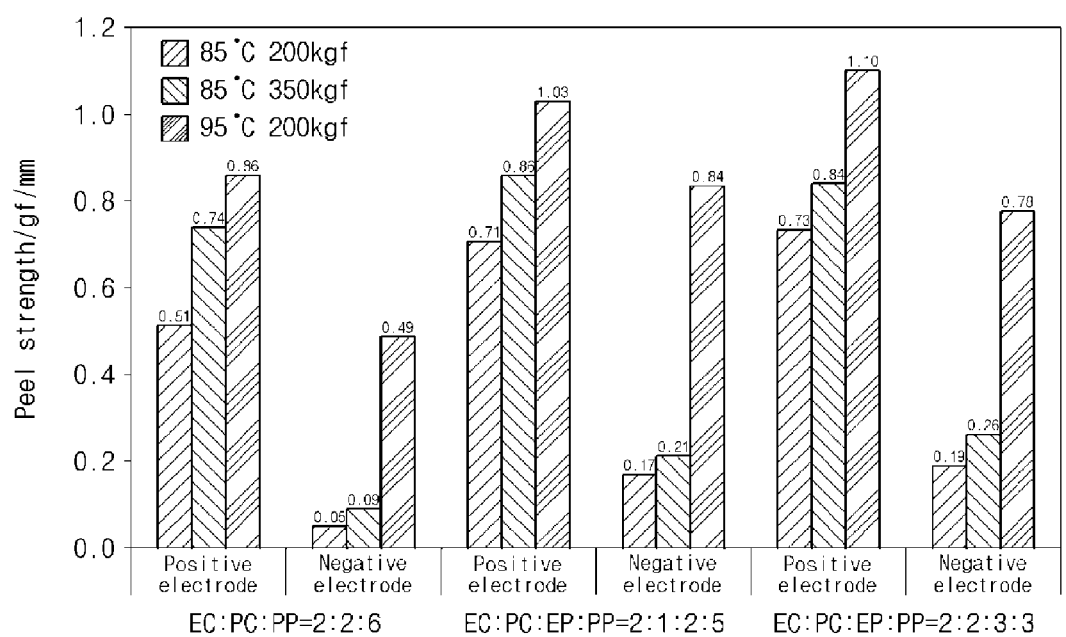
FIG. 6 is a graphical representation of binding strengths (peel strengths) of a separator having a binder according to the present disclosure coated thereon while varying compositions of electrolyte solutions.

FIG. 6 is a graphical representation of binding strengths (peel strengths) of a separator having a binder according to the present disclosure coated thereon while varying compositions of electrolyte solutions. In FIG. 6, the X axis indicates Examples 2, 3 and 4 and they axis indicates binding strength (or peel strength) (gf/mm).

In regard of binding strength evaluation, it was found that binding strength is related with not only binding temperature and pressure but also parts by volume of organic solvents contained in an electrolyte solution. Therefore, based on the finding, binding strength tests were performed while varying parts by volume of the organic solvents in the electrolyte solution.

The binding strength tests were performed in the following manner.

An electrode assembly including a separator according to the present disclosure was put into a pouch case together with an electrolyte solution and then sealed, thereby preparing first, second and third batteries. In addition, the first battery was subjected to a temperature of 85° C. under a pressure of 200 kgf, the second battery was subjected to a temperature of 85° C. under a pressure of 350 kgf, and the third battery was subjected to a temperature of 95° C. under a pressure of 200 kgf.

Next, after repeated charge/discharge cycles of the first, second and third batteries, the first, second and third batteries were disassembled to obtain separators adhered to a positive electrode plate and/or a negative electrode plate, the positive electrode plate and/or the negative electrode plate were fixed on a fixing stand, and then the separators were stretched in 180 degrees, thereby peeling the separators from the positive electrode plate and/or the negative electrode. The speed of stretching the separator was 2 cm/min and the binding strength was determined as an average of forces necessary to peel the separator for a period of time between 5 seconds to 30 seconds after starting to stretch the separator.

In Example 2, the binding strength between the separator and the positive electrode plate of the first battery was 0.51 gf/mm, the binding strength between the separator and the positive electrode plate of the second battery was 0.74 gf/mm, the binding strength between the separator and the positive electrode plate of the third battery was 0.86 gf/mm, the binding strength between the separator and the negative electrode plate of the first battery was 0.05 gf/mm, the binding strength between the separator and the negative electrode plate of the second battery was 0.09 gf/mm, and the binding strength between the separator and the negative electrode plate of the third battery was 0.49 gf/mm.

In Example 3, the binding strength between the separator and the positive electrode plate of the first battery was 0.71 gf/mm, the binding strength between the separator and the positive electrode plate of the second battery was 0.86 gf/mm, the binding strength between the separator and the positive electrode plate of the third battery was 1.03 gf/mm, the binding strength between the separator and the negative electrode plate of the first battery was 0.17 gf/mm, the binding strength between the separator and the negative electrode plate of the second battery was 0.21 gf/mm, and the binding strength between the separator and the negative electrode plate of the third battery was 0.84 gf/mm.

In Example 4, the binding strength between the separator and the positive electrode plate of the first battery was 0.73 gf/mm, the binding strength between the separator and the positive electrode plate of the second battery was 0.84 gf/mm, the binding strength between the separator and the positive electrode plate of the third battery was 1.10 gf/mm, the binding strength between the separator and the negative electrode plate of the first battery was 0.19 gf/mm, the binding strength between the separator and the negative electrode plate of the second battery was 0.26 gf/mm, and the binding strength between the separator and the negative electrode plate of the third battery was 0.78 gf/mm.

As described above, the binding strengths (or peel strengths) between the separators according to Examples of the present disclosure and each of the positive electrode plates and/or the negative electrode plates were evaluated to be in a range of approximately 0.05 gf/mm to approximately 1.10 gf/mm. In addition, the binding strengths were determined to be generally high as the processing temperature and pressure were increased. In particular, when the organic solvents were contained in the electrolyte solution in the mixture ratios by volume as in Examples 3 and 4, the binding strengths between the separator and each of the positive electrode plates and/or the negative electrode plates were relatively high.

In such a manner, since the separators according to Examples of the present disclosure are strongly bound to the positive electrode plates and/or the negative electrode plates even during charge and discharge cycles, it is possible to prevent electrical resistance from increasing at boundary regions between the separators and the positive electrode plates and/or the negative electrode plates.

Table 2 shows swelling evaluation results of the separator having the binder according to Example 1 coated thereon and the separator having the conventional binder according to Comparative Example coated thereon. In addition, initial thicknesses of the separator according to Example 1 and the separator according to Comparative Example were measured before they were put into the electrolyte solution, and the thicknesses of the separator according to Example 1 and the separator according to Comparative Example were measured after they were put into the electrolyte solution and then allowed to stand undisturbed for one day at 45° C.

TABLE 2

|  | Example | Comparative Example |
|---|---|---|
| Binder type | PVdF-HFP | Acryl-based binder |
| Electrolyte solution swelling (1 day@45° C.) | 138% | 600% |

As shown in Table 2, the separator according to Example 1 was determined to have a swelling value of approximately 138%, while the separator according to Comparative Example was determined to have a swelling value of approximately 600%.

Therefore, when the secondary battery is manufactured using the separator according to the embodiment of the present disclosure, a swelling phenomenon of the separator is suppressed, thereby improving rate characteristics of the secondary battery without lowering the air permeability of the separator.

While the secondary battery of the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A secondary battery comprising:
    an electrode assembly, said assembly including a positive electrode plate, a negative electrode plate and a separator interposed between the positive electrode plate and the negative electrode plate, wherein the separator further includes an adhesive layer formed on its surface, where the adhesive layer includes a binder, wherein the binder includes a polyvinylidene fluoride-hexafluoropropyl (PVdF-HFP) copolymer having a molecular weight in a range of 1000K g/mol to 1500K g/mol and a gel-sol transition temperature of the binder is in a range of 70° C. to 90° C.,
    wherein the separator and the positive electrode plate or the negative electrode plate are adhered to each other with a binding strength in a range of 0.05 gf/mm to 1.10 gf/mm, and
    wherein the HFP content of the PVdF-HFP copolymer ranges from 3 wt % to 7 wt %.

2. The secondary battery of claim 1, further comprising an electrolyte solution, wherein the electrolyte solution includes an organic solvent selected from the group consisting of ethylene carbonate (EC), propylene carbonate (PC), ethylpropionate (EP) and propyl propionate (PP) and mixtures of two or more compounds.

3. The secondary battery of claim 2, wherein the binder has a gel-sol transition temperature in a range of 74° C. to 88° C.

4. The secondary battery of claim 2, wherein the binder has a sol-gel transition temperature in a range of 28° C. to 51° C.

5. The secondary battery of claim 1, wherein the adhesive layer further includes inorganic particles, which are selected from the group consisting of $BaTiO_3$,
    $Pb(Zr_xTi_{1-x})O_3$ (PZT), where $0<x<1$, $Pb_{1-x}La_xZr_{1-y}Ti_yO_3$ (PLZT), where $0<x<1$ and $0<y<1$, $Pb(Mg_{1/3}Nb_{2/3})O_{3-x}$ $PbTiO_3$ (PMN-PT), where $0<x<1$, hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ and mixtures of two or more of these materials.

6. The secondary battery of claim 1, wherein the binder and the inorganic particles are contained in the adhesive layer in a weight ratio of 1:2 to 1:5.

* * * * *